(No Model.)
R. S. SEAMAN.
BOTTLE.
No. 560,653.  Patented May 26, 1896.
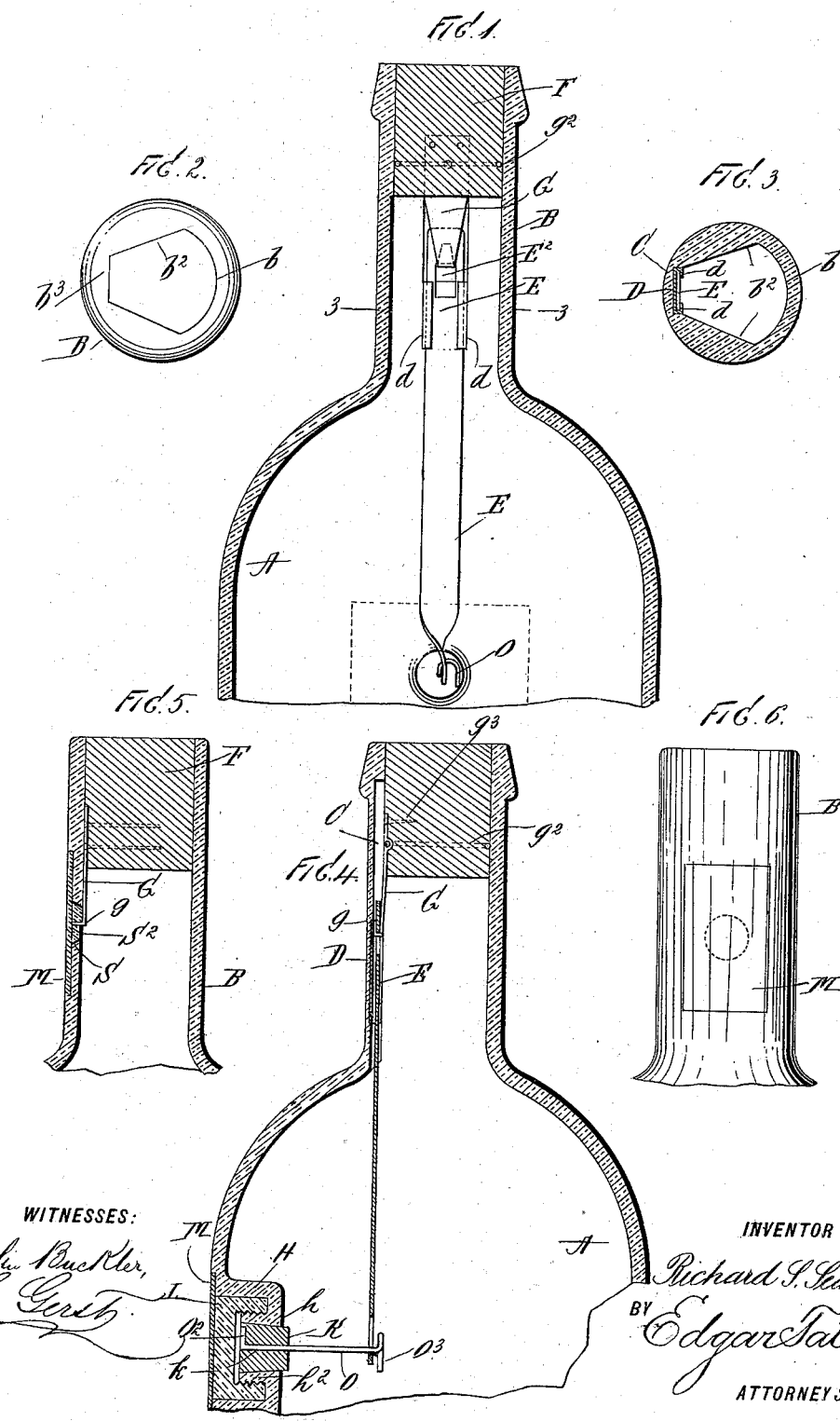

UNITED STATES PATENT OFFICE.

RICHARD SEARING SEAMAN, OF BROOKLYN, NEW YORK.

BOTTLE.

SPECIFICATION forming part of Letters Patent No. 560,653, dated May 26, 1896.

Application filed January 2, 1896. Serial No. 574,180. (No model.)

*To all whom it may concern:*

Be it known that I, RICHARD SEARING SEAMAN, a citizen of the United States, and a resident of Brooklyn, in the county of Kings and State of New York, have invented certain new and useful Improvements in Bottles, of which the following is a specification, reference being had to the accompanying drawings, forming a part thereof, in which similar letters of reference indicate corresponding parts.

The object of this invention is to provide a bottle, jug, jar, or similar vessel with a stopper and attachments which are connected therewith and with the neck or with the body portion of the vessel, and which are so constructed and arranged that when the vessel has once been filled and said attachments applied it cannot be emptied of its contents without leaving proof of the fact or without the destruction thereof, the object of this arrangement being to provide means whereby the vessel cannot be fraudulently refilled or refilled with an article which is pretended to be the same as that which the vessel originally contained.

In the drawings forming part hereof I have shown my invention applied to a bottle, and said invention is fully disclosed in the following specification, of which the accompanying drawings form a part, in which—

Figure 1 is a central vertical section of the upper part of a bottle and the neck thereof provided with my improvement; Fig. 2, a plan view of the neck; Fig. 3, a section thereof on the line 3 3; Fig. 4, a view similar to Fig. 1, at right angles thereto; Fig. 5, a central vertical section of the neck of a bottle, showing a modified form of construction; and Fig. 6, a side view thereof.

In the practice of my invention I provide a bottle A, having a neck B, the upper portion thereof or that portion which is designed to receive the stopper being irregular in form, as shown in Figs. 2 and 3, the inner walls of the neck being adapted to receive a peculiarly-constructed stopper, which can only be inserted when held in a certain position.

As shown in the drawings, the inner walls of the neck consist of a segmental portion $b$, two inclined straight sides $b^2$, which connect with the sides of the segmental portion $b$, and a straight side $b^3$, opposite the segmental or curved portion $b$.

Formed in the straight inner wall $b^3$ of the neck, opposite the curved side $b$, is a vertical slot C, in which is placed a keeper D, the sides of which are curved inwardly, as shown at $d$ in Fig. 3, so as to form guides or ways, and mounted in said keeper is a vertically-movable plate E, in the upper portion of which is formed a slot $E^2$. I also employ a stopper F, the sides of which are formed to correspond with the sides $b$, $b^2$, and $b^3$ of the neck, and secured to the shorter side thereof, which corresponds with the side $b^3$ of the neck, is a plate-spring G, the lower end of which is provided with a hook $g$, which is adapted to enter the slot $E^2$ in the sliding plate E, and the plate-spring G is secured to the stopper in any desired manner, but preferably by a band $b^2$ and a screw or other device $g^3$.

Formed in the side of the bottle A is a circular countersunk chamber H, the inner wall $h$ of which is provided with an outwardly-directed shoulder $h^2$, through which is formed a port or opening which is adapted to be closed by a plug or stopper K, provided with a central bore $k$, and mounted on the outwardly-directed shoulder $h^2$ is a cap L, over which is placed a plate M. I also provide a rod O, which is adapted to be passed through the plug or stopper K or the central bore $k$, formed therein, and the outer end of which is provided with an arm $O^2$ and the inner end thereof with a hook $O^3$, which is adapted to engage with a slot formed in the lower end of the sliding plate E and to draw said plate downwardly, as hereinafter described.

In practice I prefer to place upon the plate M a trade-mark or the name of the proprietor or manufacturer of the contents of the bottle, and as an additional precaution I may also place only a part of the trade-mark or the name of the proprietor or the manufacturer of the contents of the bottle upon said plate and the rest upon the cap L.

The operation of this form of construction will be readily understood from the foregoing description when taken in connection with the accompanying drawings.

In assembling the parts the plug K, which may be composed of any desired material and provided with a rod O, is secured in place, as shown in Fig. 4. The bottle is then filled with the desired contents, after which the stopper F is inserted into the vessel, and in this operation the hook $g$, at the lower end of the plate-spring G, will enter the slot $E^2$ in the sliding plate E. The rod O is then manipulated by means of the arm $O^2$, formed thereon, so as to cause the hook $O^3$ to enter the slot or hole in the lower end of the plate E, and the hook $O^3$ is then turned downwardly, so as to draw the plate E into its lowest position, by which operation the stopper F will be securely locked in place and cannot be removed except as hereinbefore described. The cap L is then secured in position by cement or otherwise, after which the plate M is secured in place thereover. When it is desired to empty the bottle or discharge a portion of its contents, the plate M must be first removed, after which the cap L must be removed, and this can only be done by the destruction of said cap, and after the cap L has been removed the rod L may be manipulated so as to release the lower end of the plate E, and the stopper F may then be withdrawn far enough to admit of the disconnection of the spring G with the upper end of the plate E. The arrangement of the trade-mark or other information upon the plate M and the cap L may be such that the removal of the plate M will be proof of the fact that the bottle has been once filled and emptied, and in this event the destruction of the cap L will not be necessary and the plate M may be composed of such material that the removal thereof would destroy the same, and this, of course, would produce the same result, or, in other words, the destruction of the plate M would be proof of the fact that the bottle had once been used.

In Figs. 5 and 6 I have shown a modified form of construction, in which the neck B and the stopper F are of the same form as hereinbefore described. In this form of construction I form in the neck B a port or opening S, which is adapted to be closed by a plug $S^2$, in the center of which is an opening which the hook at the lower end of the spring G is adapted to enter, and placed over the plug $S^2$, when the latter is in position, is a plate M, which is similar to that hereinbefore described, and in each case the plate M is preferably countersunk, and in each case is also provided with a trade-mark or other information, as hereinbefore described. In this form of construction, when the bottle is filled and the stopper F inserted and forced into the desired position, the hook at the lower end of the spring G will enter the central opening in the plug $S^2$, and the stopper will thus be secured in place and can only be removed by the removal or destruction of the plate M.

It will thus be seen that I accomplish the object of my invention by means of a device which is simple in construction and operation, and one which is well adapted to accomplish the result for which it is intended, while being also comparatively inexpensive.

It will also be apparent that changes in and modifications of the construction herein described may be made without departing from the spirit of my invention or sacrificing its advantages, and I therefore reserve the right to make all such changes in and modifications of the construction herein shown and described as fairly come within the scope of the invention.

Having fully described my invention, I claim as new and desire to secure by Letters Patent—

1. A bottle provided with a neck, a stopper which is adapted to be secured therein, a spring connected with one side of said stopper, and provided with a hook at its lower end, a vertically-movable plate or bar having a slot in its upper end into which said hook is adapted to enter, and means adapted to connect with the lower end of said plate or bar and passing through the side of the bottle, for operating the same, substantially as shown and described.

2. A bottle provided with a neck, a stopper which is adapted to be secured therein, a spring connected with one side of said stopper, and provided with a hook at its lower end, a vertically-movable plate or bar having a slot in its upper end into which said hook is adapted to enter, and means adapted to connect with the lower end of said plate or bar and passing through the side of the bottle, for operating the same, said means consisting of a plug which is adapted to close a port or opening formed in the side of the bottle through which passes a rod having a hook at its inner end, and which is adapted to operate in connection with the lower end of said plate or bar, substantially as shown and described.

3. A bottle provided with a neck, a stopper which is adapted to be secured therein, a spring connected with one side of said stopper, and provided with a hook at its lower end, a vertically-movable plate or bar having a slot in its upper end into which said hook is adapted to enter, and means adapted to connect with the lower end of said plate or bar and passing through the side of the bottle, for operating the same, said means consisting of a plug which is adapted to close a port or opening formed in the side of the bottle through which passes a rod having a hook at its inner end, and which is adapted to operate in connection with the lower end of said plate or bar, the side of the bottle being also provided with a countersunk, circular chamber which is provided centrally with a shoulder or projection through which said plug passes, and a cap which is adapted to be secured in position over said shoulder or projection, substantially as shown and described.

4. A bottle provided with a neck, a stopper which is adapted to be secured therein, a spring connected with one side of said stopper, and provided with a hook at its lower end, a vertically-movable plate or bar having a slot in its upper end into which said hook is adapted to enter, and means adapted to connect with the lower end of said plate or bar and passing through the side of the bottle, for operating the same, said means consisting of a plug which is adapted to close a port or opening formed in the side of the bottle, through which passes a rod having a hook at its inner end, and which is adapted to operate in connection with the lower end of said plate or bar, the side of the bottle being also provided with a countersunk, circular chamber which is provided centrally with a shoulder or projection through which said plug passes, a cap which is adapted to be secured in position over said shoulder or projection, and said bottle being also provided with a plate which is adapted to be secured in position over said cap, substantially as shown and described.

In testimony that I claim the foregoing as my invention I have signed my name, in presence of the subscribing witnesses, this 30th day of December, 1895.

RICHARD SEARING SEAMAN.

Witnesses:
C. GERST,
L. M. MULLER.